(12) United States Patent
Yang et al.

(10) Patent No.: US 10,171,801 B2
(45) Date of Patent: Jan. 1, 2019

(54) DISPLAY DEVICE AND DISPLAY METHOD

(71) Applicant: Japan Display Inc., Tokyo (JP)

(72) Inventors: Yingbao Yang, Tokyo (JP); Takeo Koito, Tokyo (JP); Daichi Suzuki, Tokyo (JP)

(73) Assignee: Japan Display Inc., Tokyo (JP)

( * ) Notice: Subject to any disclaimer, the term of this patent is extended or adjusted under 35 U.S.C. 154(b) by 265 days.

(21) Appl. No.: 15/049,482

(22) Filed: Feb. 22, 2016

(65) Prior Publication Data

US 2016/0249046 A1 Aug. 25, 2016

(30) Foreign Application Priority Data

Feb. 24, 2015 (JP) .................................. 2015-034055

(51) Int. Cl.
*H04N 13/04* (2006.01)
*H04N 13/398* (2018.01)
*H04N 13/32* (2018.01)
*H04N 13/376* (2018.01)

(52) U.S. Cl.
CPC ........... *H04N 13/398* (2018.05); *H04N 13/32* (2018.05); *H04N 13/376* (2018.05)

(58) Field of Classification Search
None
See application file for complete search history.

(56) References Cited

U.S. PATENT DOCUMENTS

| 8,767,050 | B2* | 7/2014 | Bennett | G06F 3/14 348/51 |
| 2011/0157339 | A1* | 6/2011 | Bennett | G06F 3/14 348/59 |
| 2013/0003176 | A1 | 1/2013 | Yang et al. | |
| 2013/0147045 | A1 | 6/2013 | Grossi et al. | |
| 2013/0148045 | A1 | 6/2013 | Ohyama et al. | |
| 2013/0162691 | A1* | 6/2013 | Yang | H04N 13/0409 345/690 |

FOREIGN PATENT DOCUMENTS

| JP | 2013-015619 | 1/2013 |
| JP | 2013-125042 | 6/2013 |

* cited by examiner

*Primary Examiner* — Kate H Luo
(74) *Attorney, Agent, or Firm* — K&L Gates LLP

(57) ABSTRACT

According to an aspect, a display device includes: a position information acquiring unit that acquires position information on a position of a viewer; a separation unit that changes a position of an image separator based on the position information; an illumination unit that changes a direction of an optical axis of illumination light based on the position information of the viewer in synchronization with a timing at which the position of the image separator is changed; and a display unit that modulates the illumination light and displays an image including plural parallax images.

17 Claims, 17 Drawing Sheets

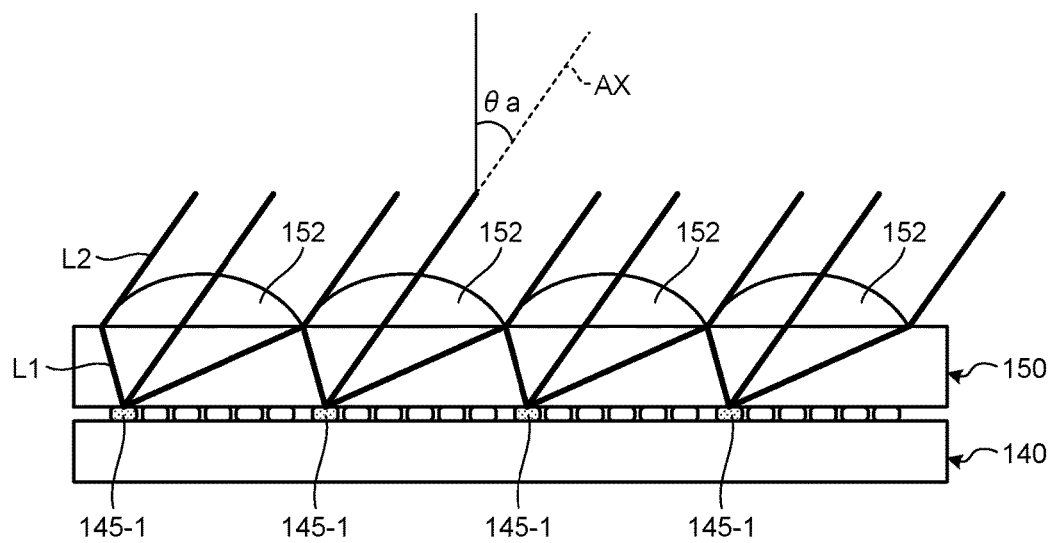
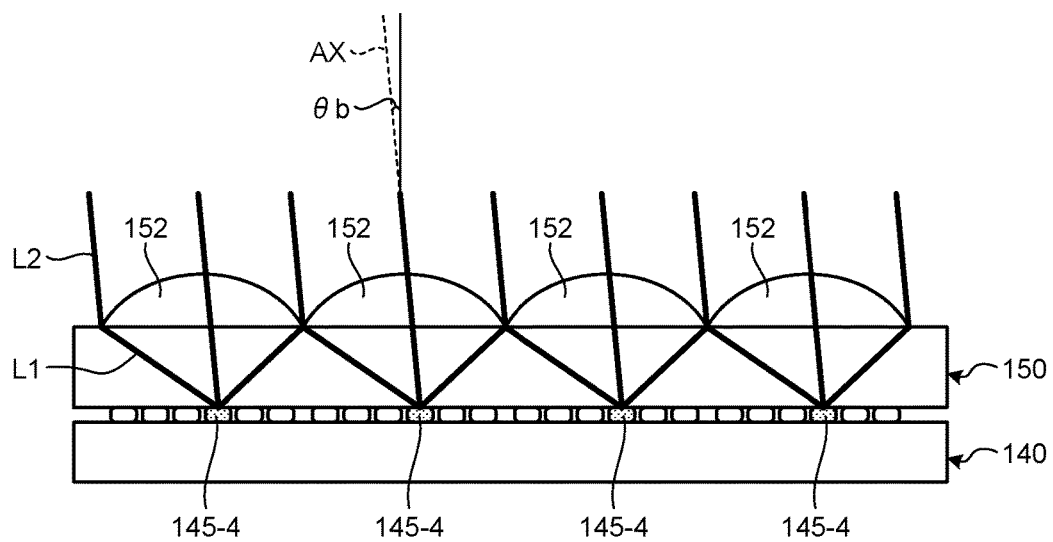

DISPLAY DEVICE AND DISPLAY METHOD

CROSS-REFERENCE TO RELATED APPLICATIONS

This application claims priority from Japanese Application No. 2015-034055, filed on Feb. 24, 2015, the contents of which are incorporated by reference herein in its entirety.

BACKGROUND

Technical Field

The present disclosure relates to a display device and a display method.

Description of the Related Art

A display device is known which displays a stereoscopic image using an image separator (see Japanese Patent Application Laid-open Publication No. 2013-125042 (JP-A-2013-125042)). A parallax barrier or a lenticular lens is used as the image separator. In such a type of display device, when a relative position of the image separator and a viewer is shifted, display defect called a reverse view occurs and thus a stereoscopic image is not correctly displayed. Accordingly, in JP-A-2013-125042, the position of a viewer is detected using a camera and the position of the image separator is changed based on the position of the viewer.

In the display device, a light source emitting light in a wide angle range is used as a light source forming a stereoscopic image such that a viewer can view the stereoscopic image at various positions. However, in this configuration, since light is uniformly emitted even to a position which is not viewed, an amount of light not contributing to a display is large. Accordingly, there is a large optical loss.

SUMMARY

According to an aspect, a display device includes: a position information acquiring unit that acquires position information on a position of a viewer; a separation unit that changes a position of an image separator based on the position information; an illumination unit that changes a direction of an optical axis of illumination light based on the position information of the viewer in synchronization with a timing at which the position of the image separator is changed; and a display unit that modulates the illumination light and displays an image including plural parallax images.

BRIEF DESCRIPTION OF THE DRAWINGS

FIG. 6 is a diagram illustrating a relationship between lighting positions of light sources and an optical axis direction of illumination light;

FIG. 7 is a diagram illustrating a relationship between lighting positions of light sources and an optical axis direction of illumination light;

FIG. 15 is a diagram illustrating a relationship between a distance between a viewer and a display unit and an optimal number of light sources turned on;

DETAILED DESCRIPTION

Figure 1:
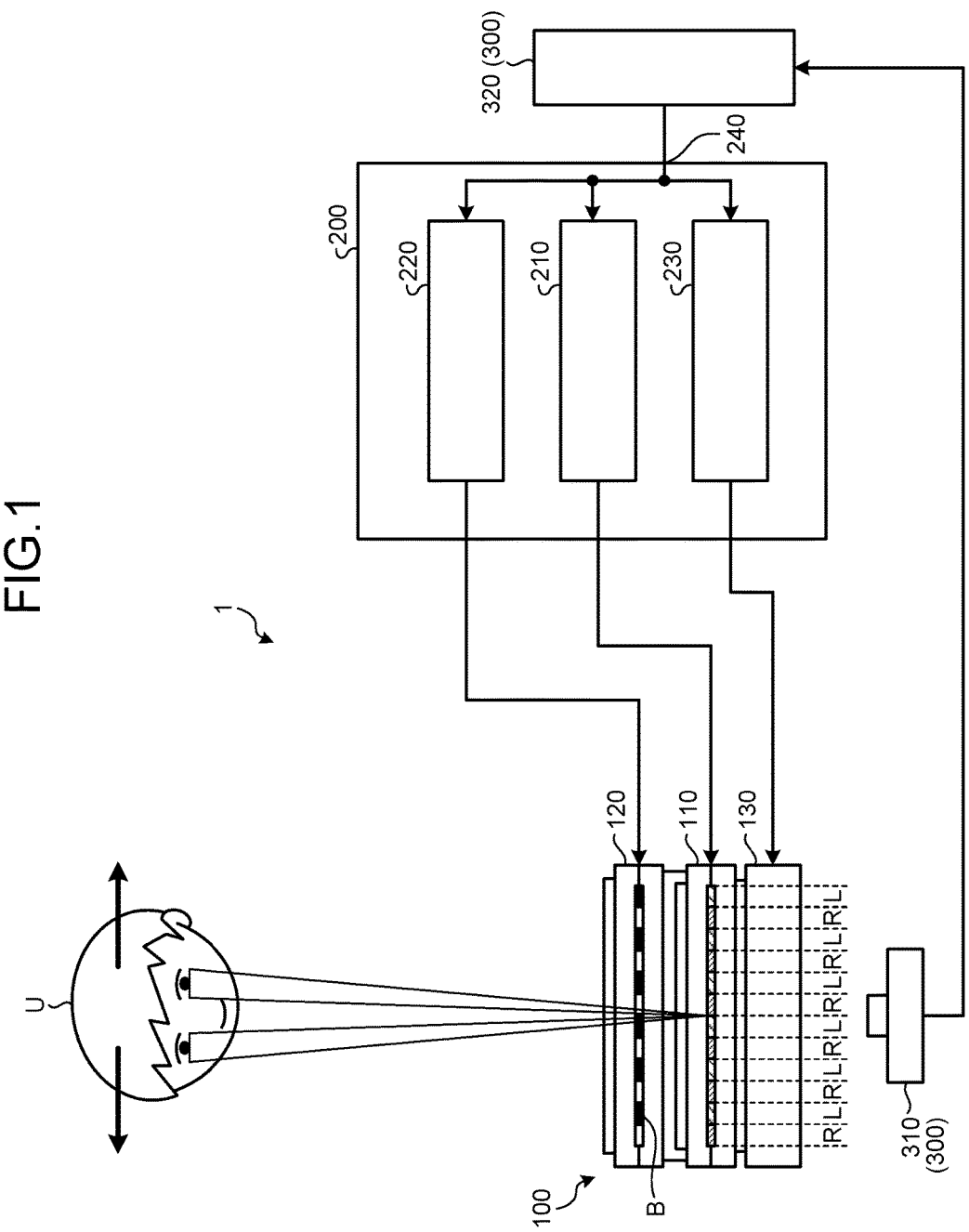
FIG. 1 is a schematic diagram of a display device according to an embodiment.

Modes (embodiments) for carrying out the invention will be described in detail with reference to the accompanying drawings. The present invention is not limited to details described in the following embodiments. Elements described below include elements which can be easily thought out by those skilled in the art and elements substantially identical thereto. Elements described below can be appropriately combined. This disclosure is merely an example, and appropriate modifications without departing from the gist of the invention which can be easily thought out by those skilled in the art belong to the scope of the present invention. In order to make description more clear, the drawings schematically illustrate widths, thicknesses, shapes, and the like of elements unlike actual values, which are only an example and do not limit interpretation of the present invention. In this specification and the drawings, the same elements as described with reference to an existing drawing will be referenced by the same reference numerals and signs and detailed description thereof will not be repeated.

FIG. 1 is a schematic view of a display device 1 according to an embodiment.

The display device 1 includes an image forming unit 100, a control unit 200, and a detection unit 300.

The image forming unit 100 includes a display unit 110, a separation unit 120, and an illumination unit 130. The image forming unit 100 forms an image by causing the display unit 110 to modulate illumination light emitted from the illumination unit 130. A viewer U views the image displayed on the display unit 110 via the separation unit 120. The image forming unit 100 has a 3D mode in which a stereoscopic image is displayed and a 2D mode in which a two-dimensional image is displayed. When a display is performed in the 3D mode, an image separator B is formed in the separation unit 120 and a 3D image including plural parallax images (a right-eye parallax image R and a left-eye parallax image L) is displayed on the display unit 110. Parallax images are images corresponding to different viewpoints. When a display is performed in the 2D mode, an image separator B is not formed in the separation unit 120 and a 2D image not including parallax images is displayed on the display unit 110. Details of the image forming unit 100 will be described later.

The control unit 200 includes a display control unit 210, a separator control unit 220, and an illumination control unit 230. The display control unit 210 controls the display unit 110 so as to display a 3D image or a 2D image on the display unit 110. The separator control unit 220 controls the separation unit 120 so as to form an image separator B in the separation unit 120 in the 3D mode. The separator control unit 220 controls a position at which the image separator B is formed, a timing at which the image separator B is formed, and the like. The illumination control unit 230 controls the illumination unit 130 so as to irradiate the display unit 110 with illumination light from the illumination unit 130. The illumination control unit 230 controls a direction of an optical axis of illumination light (a center line of illumination light), a spread angle of illumination light, a timing at which illumination light is emitted, and the like.

The detection unit 300 detects position information on a position of a viewer U and supplies the position information to the position information acquiring unit 240. The position information acquiring unit 240 is, for example, a connector which is electrically coupled to the control unit 200. The detection unit 300 includes an imaging unit 310 that images a viewer U and an image analyzing unit 320 that analyzes an image of a viewer U captured by the imaging unit 310 and detects the position information. The position information acquiring unit 240 acquires the position information on the position of the viewer U from the image analyzing unit 320.

The control unit 200 controls the display unit 110, the separation unit 120, and the illumination unit 130 based on the position information of the viewer U. When a display is performed in the 3D mode, the separation unit 120 changes the position of the image separator B based on the position information. The illumination unit 130 changes the direction of the optical axis of illumination light based on the position information in synchronization with the timing at which the position of the image separator B is changed. The display unit 110 modulates illumination light and displays an image (3D image) including plural parallax images. When a display is performed in the 2D mode, the separation unit 120 does not form the image separator B and the illumination unit 130 changes the direction of the optical axis of illumination light based on the position information. The display unit 110 modulates the illumination light and displays an image (2D image).

Figure 2:
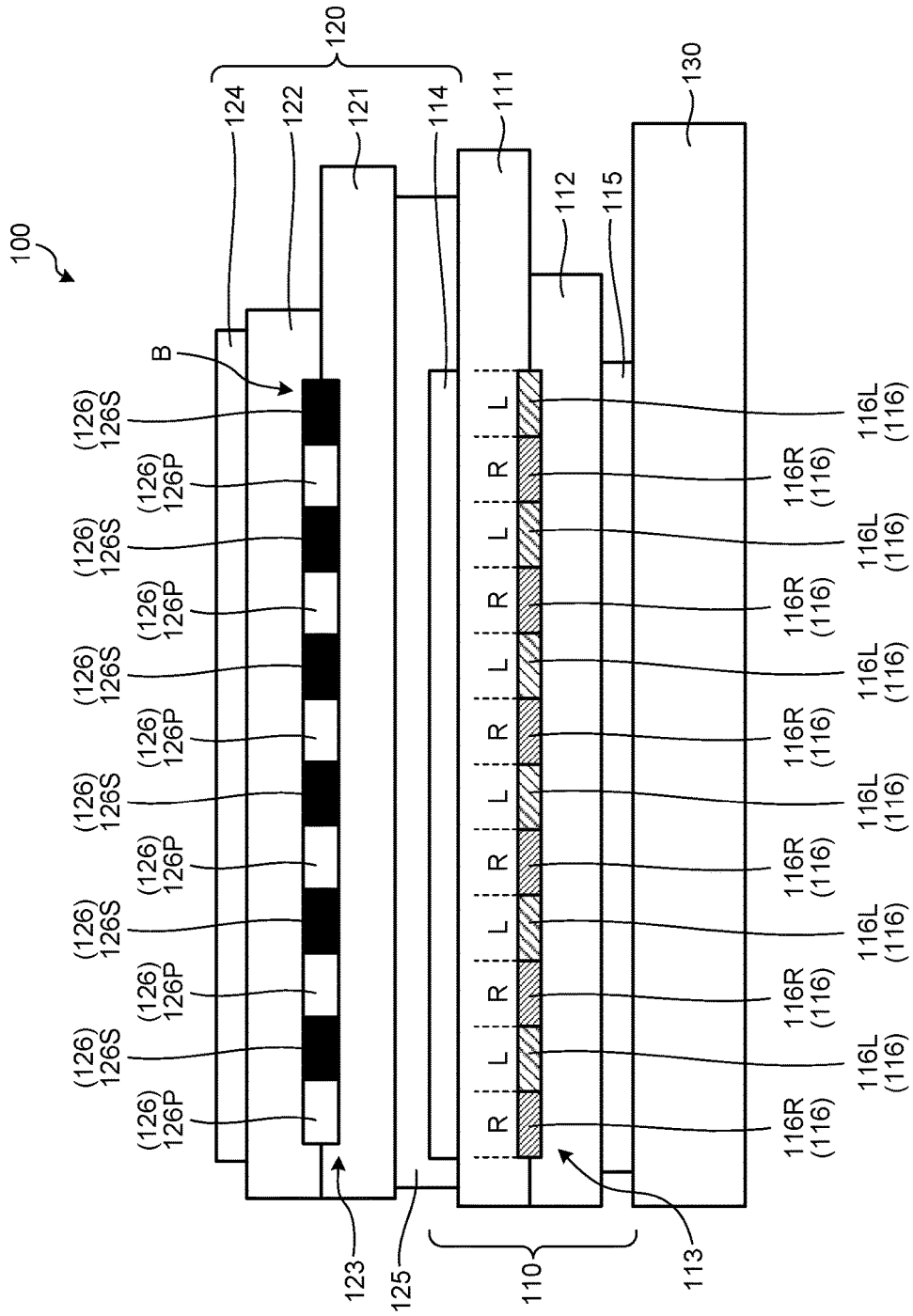
FIG. 2 is a cross-sectional view schematically illustrating a configuration of an image forming unit.

FIG. 2 is a cross-sectional view schematically illustrating a configuration of the image forming unit 100.

The image forming unit 100 includes the display unit 110, the separation unit 120, and the illumination unit 130. In the following description, configurations of elements will be described based on definitions that a side on which a viewer U views an image is defined as a "front side" and a side opposite to the side on which a viewer U views an image is defined as a "rear side".

The display unit 110 includes a first substrate 111, a second substrate 112, a liquid crystal layer 113, a first polarizing plate 114, and a second polarizing plate 115. Illumination light emitted from the illumination unit 130 is transmitted by the second polarizing plate 115, is incident on the liquid crystal layer 113, and is modulated by the liquid crystal layer 113. The illumination light modulated by the liquid crystal layer 113 is transmitted by the first polarizing plate 114 and is displayed as an image. The display mode of the display unit 110 is not particularly limited, and known display modes such as an electrically controlled birefringence (ECB) mode and a twisted nematic (TN) mode are employed. A vertical electric field mode using a vertical (the thickness direction of the liquid crystal layer 113) electric field such as a vertical alignment (VA) mode or a horizontal electric field mode using a horizontal (the direction perpendicular to the thickness direction of the liquid crystal layer 113) electric field such as an in-plane switching (IPS) mode can be employed as an ECB mode.

The display unit 110 is provided with plural pixels arranged in a matrix shape. One pixel includes plural subpixels displaying different colors. A combination of colors which is displayed by plural subpixels is arbitrary. For example, one pixel may include three subpixels displaying three colors of red, green, and blue. One pixel may include three subpixels displaying three colors of cyan, yellow, and magenta. In order to enlarge a color gamut, one pixel may include four or more subpixels.

When a display is performed in the 2D mode, a 2D image is displayed on the display unit 110 by plural pixels. When a display is performed in the 3D mode, a 3D image including plural parallax images is displayed on the display unit 110 by plural pixels. When a display is performed in 3D mode, plural image areas 116 corresponding to the plural parallax images are alternately arranged in one direction on the display unit 110.

Figure 21:
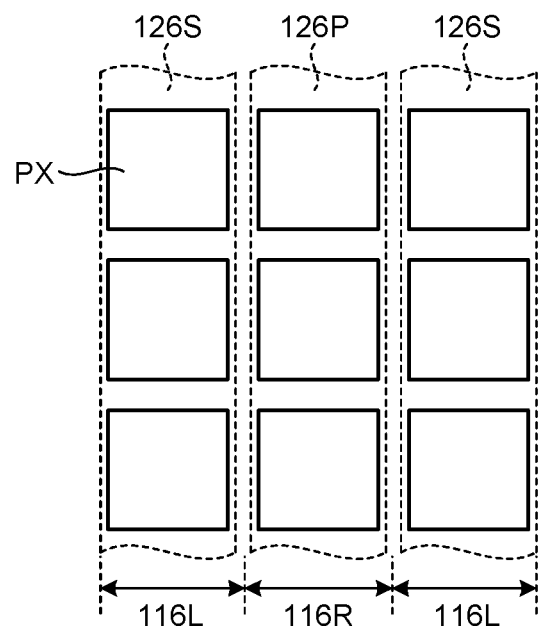
FIG. 21 is a diagram illustrating an example of a shape of image areas and shutter areas.
Figure 22:
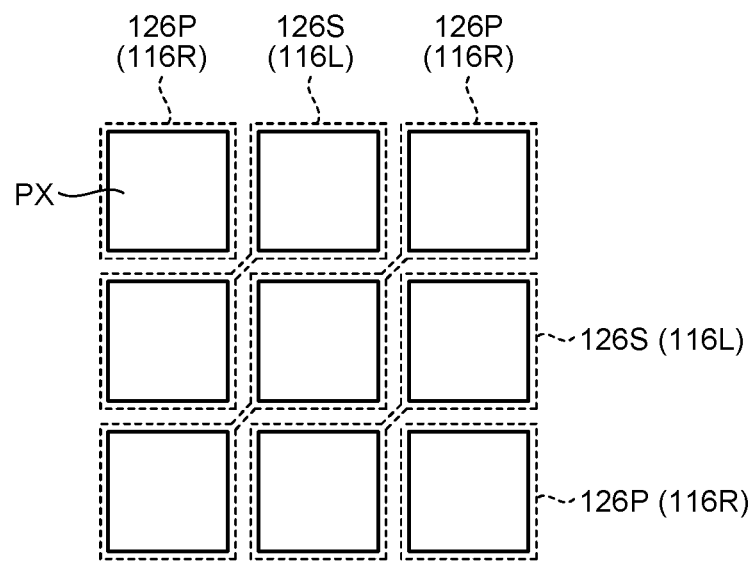
FIG. 22 is a diagram illustrating an example of a shape of image areas and shutter areas.

The plural image areas 116 may be formed in a stripe shape along one side of a rectangular pixel, or may be formed in a step shape or a delta shape along two sides of a rectangular pixel. For example, FIG. 21 illustrates an example in which the plural image areas 116 (right-eye image areas 116R and left-eye image areas 116L) are formed in a stripe shape along one side of a rectangular pixel or subpixel PX, and FIG. 22 illustrates an example in which the plural image areas 116 are formed in a step shape along two sides of a rectangular pixel or subpixel PX. When the image areas 116 are formed in a stripe shape, each image area 116 has a length direction which is a direction parallel to one side of a pixel. When the image areas 116 are formed in a step shape or a delta shape, each image area 116 has a length direction which is a direction (a direction in which the step shape or the delta shape are continuously arranged in a direction intersecting one side of a pixel) obliquely intersecting one side of a pixel. The plural image areas 116 are alternately arranged in one direction perpendicular to the length direction of the image area 116.

Each of the image areas 116 is formed by plural pixels or plural subpixels which are arranged in a stripe shape, step shape, or delta shape. For example, in FIG. 2, the plural right-eye image areas 116R and the plural left-eye image areas 116L are alternately arranged in one direction. A right-eye parallax image R is displayed by the plural right-eye image areas 116R and a left-eye parallax image L is displayed by the plural left-eye image areas 116L.

The separation unit 120 is disposed on the front side of the display unit 110 with an adhesive layer 125 interposed therebetween. The separation unit 120 includes a first substrate 121, a second substrate 122, a liquid crystal layer 123, the first polarizing plate 114, and a third polarizing plate 124. The first polarizing plate 114 is also used as the first polarizing plate 114 of the display unit 110. Illumination light passing through the first polarizing plate 114 is modulated by the liquid crystal layer 123. The illumination light modulated by the liquid crystal layer 123 is transmitted by the third polarizing plate 124 and is observed by a viewer. The display mode of the separation unit 120 is not particularly limited, and known display modes such as an ECB mode and a TN mode are employed. A vertical electric field mode such as a VA mode or a horizontal electric field mode such as an IPS mode can be employed as an ECB mode.

The separation unit 120 includes plural shutter areas 126 of which light transmittance can be controlled. The transmittance of each of the plural shutter areas 126 is controlled based on a separator control signal input to the separation unit 120. A voltage applied to the liquid crystal layer 123 of each of the shutter areas 126 is controlled based on the separator control signal and thus a degree of modulation of the liquid crystal layer 123 of each of the plural shutter areas 126 is controlled.

For example, each of the plural shutter areas 126 is controlled to one of an ON state in which a voltage is applied to the liquid crystal layer 123 and an OFF state in which a voltage is not applied to the liquid crystal layer 123 based on the separator control signal. When the shutter area 126 is in the ON state, the polarization direction of illumination light incident on the shutter area 126 is adjusted to a direction in which the illumination light is absorbed by the third polarizing plate 124. Accordingly, the transmittance of the shutter area 126 decreases. When the shutter area 126 is in the OFF state, the polarization direction of illumination light incident on the shutter area 126 is adjusted to a direction in which the illumination light is transmitted by the third polarizing plate 124. Accordingly, the transmittance of the shutter area 126 increases.

As illustrated in FIG. 2, when a display is performed in the 3D mode, the separation unit 120 decreases the transmittance of the shutter areas 126S located at positions at which the image separator B should be formed among the plural shutter areas 126. Accordingly, the image separator B as a parallax barrier is formed. The image separator B is formed by the shutter areas 126S of which the transmittance has decreased. The shutter areas 126P located at positions at which the image separator B is not formed have high transmittance. When a display is performed in the 2D mode, the transmittance of all the shutter areas 126 is kept high. By electrically controlling the transmittance of the plural shutter areas 126, the position of the image separator B is controlled at a high speed and with high precision. Accordingly, even when the position of the viewer U is changed, the position of the image separator B is always located at an appropriate position to follow the change in the position of the viewer U.

The shape of the shutter areas 126 is arbitrary. In the separation unit 120, plural rectangular shutter areas 126 may be arranged in a matrix shape. In the separation unit 120, plural shutter areas 126 having a stripe shape, a step shape, or delta shape corresponding to the shape of the image areas 116 may be arranged in one direction or in two directions. For example, FIG. 21 illustrates an example in which the plural shutter areas 126 (shutter areas 126S and shutter areas 126P) are formed in a stripe shape in parallel to the length direction of the plural image areas 116, and FIG. 22 illustrates an example in which the plural shutter areas 126 are formed in a step shape along the length direction (the direction obliquely intersecting one side of a pixel or subpixel PX) of the plural image areas 116. The pitch of the shutter areas 126 in the arrangement direction of the image areas 116 (the direction perpendicular to the length direction of the image areas 116) is preferably smaller than the pitch of the image areas 116. Accordingly, the position of the image separator B can be finely adjusted depending on the position of a viewer U.

The illumination unit 130 is disposed on the rear side of the display unit 110. The illumination unit 130 illuminates the display unit 110 from the rear side. Illumination light emitted from the illumination unit 130 is transmitted by the display unit 110 and the separation unit 120 and is observed by a viewer U. The illumination light transmitted by the display unit 110 is displayed as an image. When a display is performed in the 3D mode, the illumination light transmitted by the display unit 110 is displayed as an image including plural parallax images (a right-eye parallax image R and a left-eye parallax image L). The parallax images included in the image are separated by the image separator B formed in the separation unit 120 and are incident on the right eye and the left eye of the viewer U, respectively. Accordingly, a stereoscopic image is observed by the viewer U.

Figure 3:
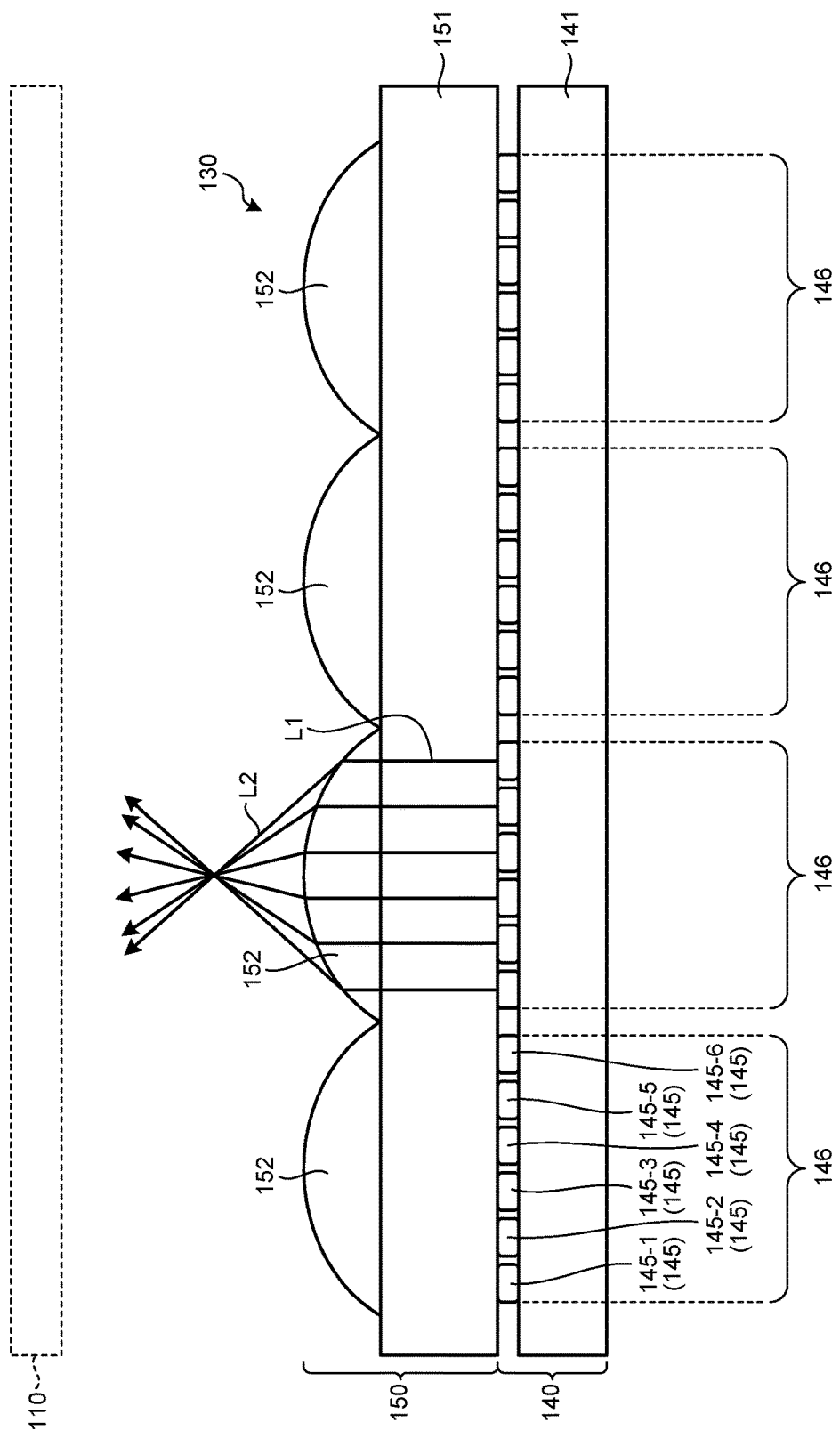
FIG. 3 is a cross-sectional view illustrating a configuration of a principal part of an illumination unit.
Figure 4:
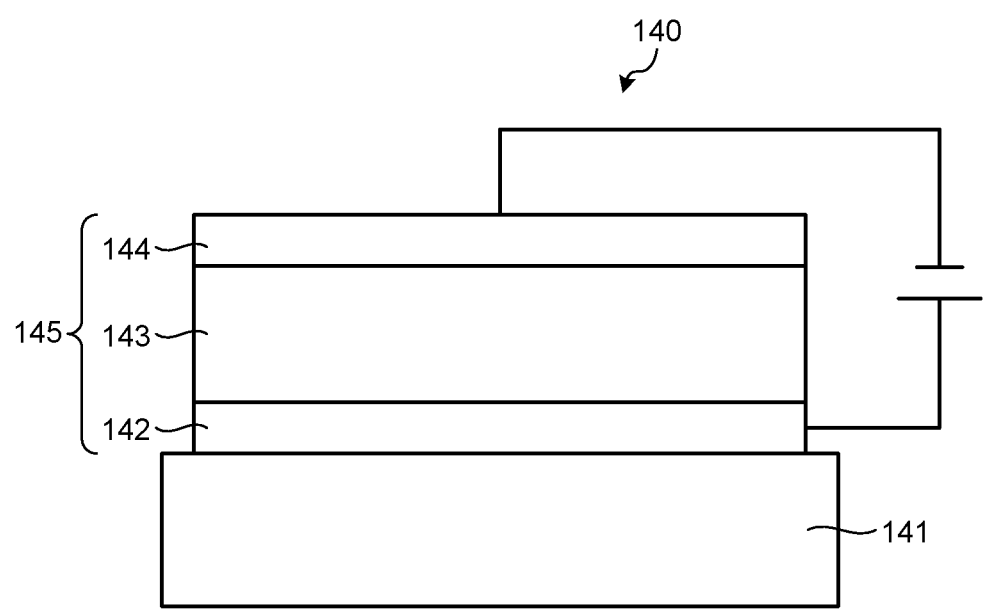
FIG. 4 is a schematic diagram illustrating a configuration of a light source disposed in the illumination unit.
Figure 5:
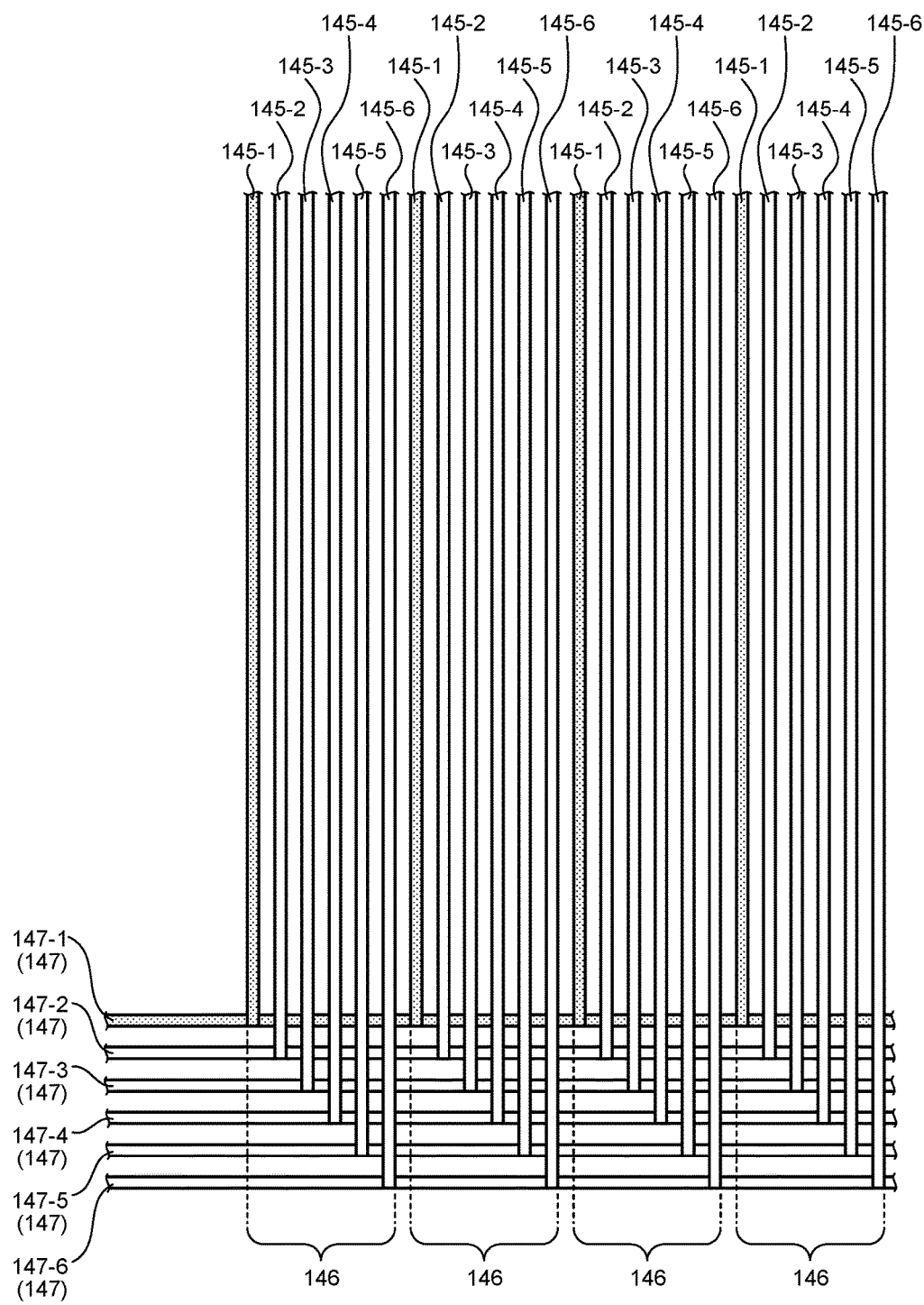
FIG. 5 is a view of a light source substrate disposed in the illumination unit when viewed from the front side.

FIG. 3 is a cross-sectional view illustrating the configuration of a principal part of the illumination unit 130. FIG. 4 is a diagram schematically illustrating the configuration of a light source 145 disposed in the illumination unit 130. FIG. 5 is a view of a light source substrate 140 disposed in the illumination unit 130 when viewed from the front side.

As illustrated in FIG. 3, the illumination unit 130 includes the light source substrate 140 and a light adjustment substrate 150. The light source substrate 140 and the light adjustment substrate 150 are disposed to face the second polarizing plate 115 (see FIG. 2) of the display unit 110. The light adjustment substrate 150 and the light source substrate 140 are arranged in this order from the display unit 110 side.

The light source substrate 140 includes a substrate 141 and plural light sources 145 arranged on the substrate 141. As illustrated in FIG. 4, each light source 145 is, for example, an organic EL element in which a positive electrode 142, an organic light-emitting layer 143, and a negative electrode 144 are sequentially stacked from the substrate 141 side. If necessary, a hole injection layer and a hole transport layer are disposed between the organic light-emitting layer 143 and the positive electrode 142. If necessary, an electron injection layer and an electron transport layer are disposed between the organic light-emitting layer 143 and the negative electrode 144.

As illustrated in FIG. 5, the light sources 145 are formed in a stripe shape. Each light source 145 extends in parallel to the length direction of the image area 116 (see FIG. 2). The light sources 145 are arranged in a direction parallel to the arrangement direction of the image areas 116. Plural wirings 147 extending in the direction intersecting the light sources 145 are disposed on one end side of the light sources 145. In FIG. 5, the number of wirings 147 is six, but the number of wirings 147 is not limited to six.

Every six light sources 145 are electrically coupled to the same wiring 147. Accordingly, the light sources 145 are grouped into six groups. The light sources 145 included in each group are simultaneously driven by the same wiring 147. Six neighboring light sources 145 are electrically coupled to different wirings 147 and driving thereof is independently controlled. The light sources 145 having the same relative position in each light adjustment set among the light sources 145 disposed in the illumination unit 130 are electrically coupled by the common wiring 147 and are subjected to the same control by the control unit 200. The six neighboring light sources 145 constitute one light source group 146. On the substrate 141, plural light source groups 146 are arranged in the arrangement direction of the light sources 145.

The number of light sources 145 included in each light source group 146 can be increased or decreased depending on the number of wirings 147. When the number of wirings 147 is n (where n is an integer equal to or greater than 2), every n light sources 145 are electrically coupled to the same wiring 147. Accordingly, the light sources 145 are grouped into n groups. The light sources 145 included in each group are simultaneously driven by the same wiring 147. The n neighboring light sources 145 are electrically coupled to different wirings 147 and driving thereof is independently controlled. The n neighboring light sources 145 constitute one light source group 146.

When the wirings 147 are distinguished from each other, numerals are added to heads of names of the wirings 147 and the numerals are also added to tails of reference signs thereof. When the light sources 145 which are independently driven by the wirings 147 are distinguished from each other, numerals are added to heads of names of the light sources 145 and the numerals are also added to tails of reference signs thereof.

As illustrated in FIG. 3, the light adjustment substrate 150 includes a substrate 151 and plural light adjustment layers 152 disposed on the substrate 151. The light adjustment layers 152 extend in parallel to the length direction of the light sources 145. The light adjustment layers 152 are disposed in one-to-one correspondence with the light source groups 146. The light adjustment layers 152 are disposed to face the light sources 145 included in the corresponding light source groups 146 and adjust light L1 emitted from the light sources 145 such that the optical axes thereof have different directions. One light adjustment set is constituted by one light adjustment layer 152 and plural light sources 145 facing the light adjustment layer 152. The illumination unit 130 includes plural light adjustment sets which are arranged in a direction parallel to the arrangement direction of the image areas 116. For example, the light adjustment layer 152 is a lens in which a cross-section parallel to the arrangement direction of the light sources 145 is convex to the display unit 110.

FIG. 3 illustrates an example in which each light adjustment layer 152 is formed of a plano-convex lens, but the lens only has to change the direction of transmitted light depending on the positions of the light sources. One of a plano-convex lens and a Fresnel lens may be used as the lens. That is, the light adjustment layer 152 may be a spherical lens having a spherical surface such as a plano-convex lens or may be an aspherical lens having an aspherical surface such as a Fresnel lens.

The illumination unit 130 irradiates the display unit 110 with light L1 emitted from one or more light sources 145 turned on in each light source group 146 as illumination light L2. The illumination unit 130 changes the lighting position of the light sources 145 based on the position information of the viewer in synchronization with the timing at which the position of the image separator B (see FIG. 2) is changed.

Figure 8:
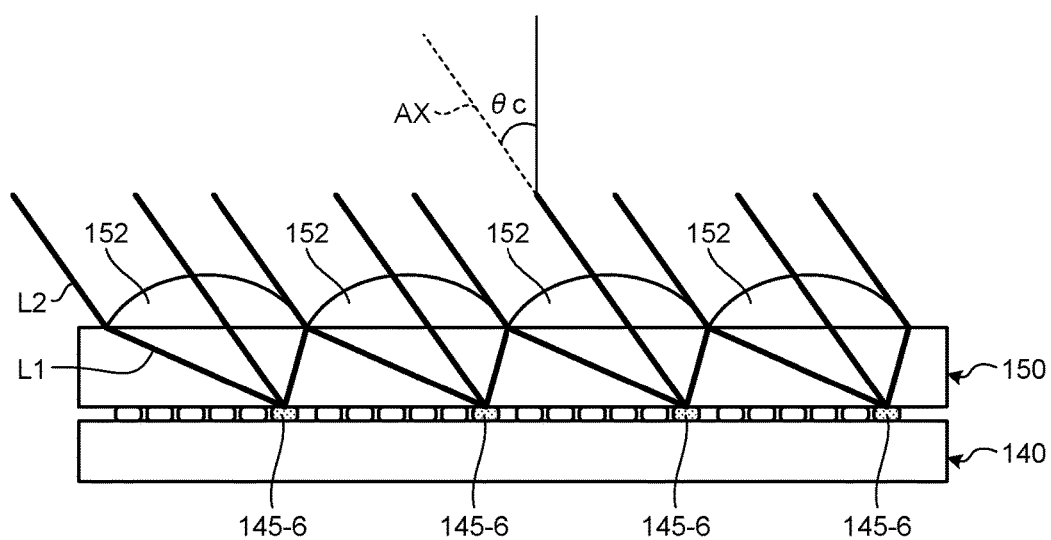
FIG. 8 is a diagram illustrating a relationship between lighting positions of light sources and an optical axis direction of illumination light.

FIGS. 6 to 8 are diagrams illustrating a relationship between the lighting positions of the light sources 145 and the direction of the optical axis AX of illumination light L2.

As illustrated in FIG. 6, when a first light source 145-1 disposed to face the left end of the light adjustment layer 152 is turned on, light L1 emitted from the first light source 145-1 is converted into illumination light L2 having an optical axis AX in a direction greatly inclined to the right side by the light adjustment layer 152. The illumination light L2 is incident on the display unit at a large angle θa to a normal direction of the display unit or the separation unit. The illumination light L2 is efficiently emitted to a viewer who views an image from the right side.

As illustrated in FIG. 7, when a fourth light source 145-4 disposed to face the center of the light adjustment layer 152 is turned on, light L1 emitted from the fourth light source 145-4 is converted into illumination light L2 having an optical axis AX in a direction slightly inclined to the left side by the light adjustment layer 152. The illumination light L2 is incident on the display unit at a small angle θb to a normal direction of the display unit or the separation unit. The illumination light L2 is efficiently emitted to a viewer who views an image from the center or a slightly left side.

As illustrated in FIG. 8, when a sixth light source 145-6 disposed to face the right end of the light adjustment layer 152 is turned on, light L1 emitted from the sixth light source 145-6 is converted into illumination light L2 having an optical axis AX in a direction greatly inclined to the left side by the light adjustment layer 152. The illumination light L2 is incident on the display unit at a large angle θc to a normal direction of the display unit or the separation unit. The illumination light L2 is efficiently emitted to a viewer who views an image from the left side.

Figure 9:
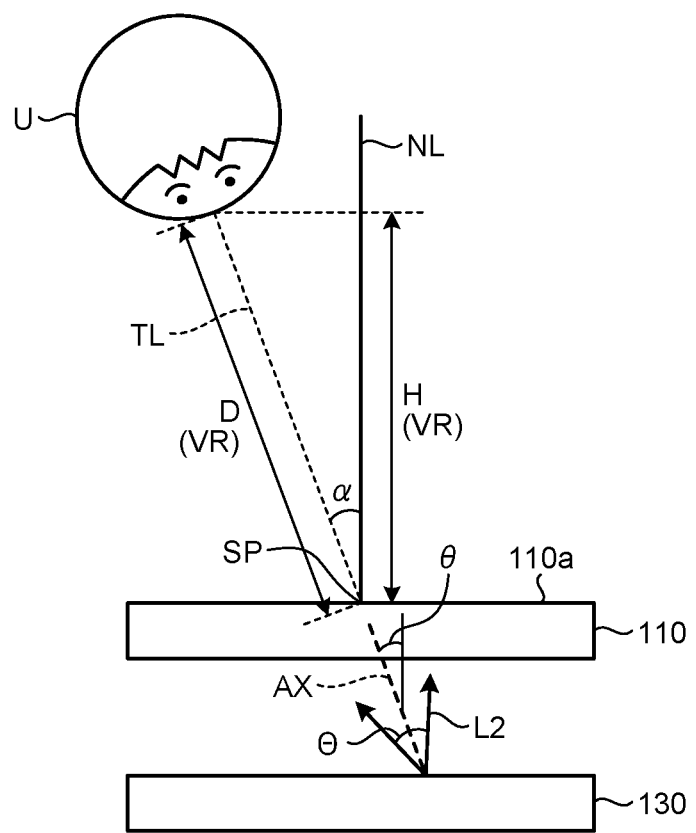
FIG. 9 is a diagram illustrating a method of setting an optical axis direction and a spread angle of illumination light.
Figure 10:
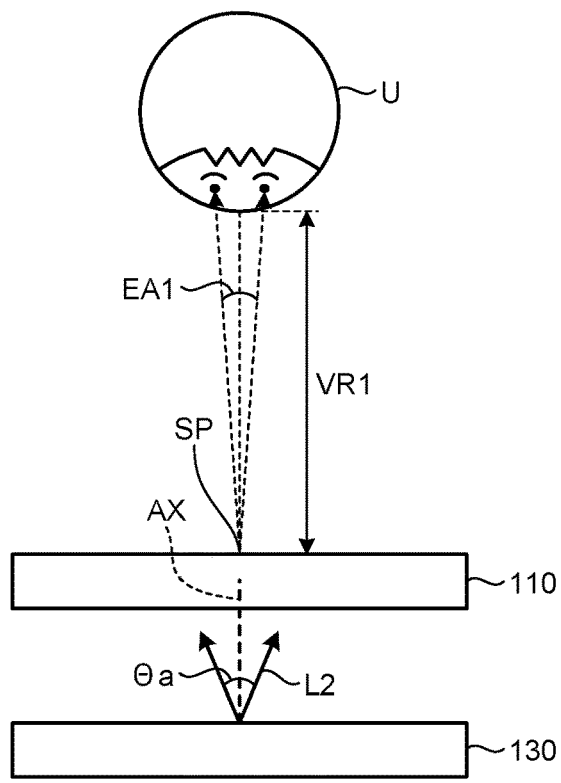
FIG. 10 is a diagram illustrating a method of setting an optical axis direction and a spread angle of illumination light.
Figure 11:
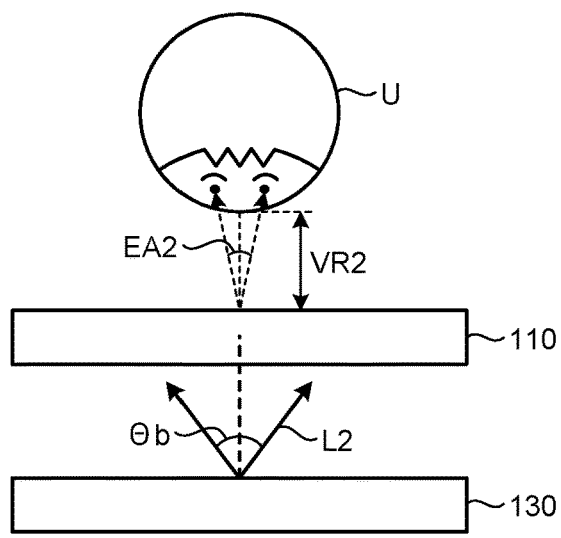
FIG. 11 is a diagram illustrating a method of setting an optical axis direction and a spread angle of illumination light.

FIGS. 9 to 11 are diagrams illustrating a method of setting the direction of the optical axis AX of illumination light L2 and the spread angle Θ of the illumination light L2. In FIGS. 9 to 11, the separation unit and the like are not illustrated.

As illustrated in FIG. 9, the direction of the optical axis AX of illumination light L2 is controlled based on the position of a viewer U. The illumination unit 130 emits illumination light L2 in a direction in which a viewer U views an image on the display unit 110. The detection unit 300 illustrated in FIG. 1 detects, for example, an angle (hereinafter, referred to as an "observation angle") α at which a viewer U views the display unit 110. The observation angle α is, for example, an angle which is formed by a virtual line TL connecting a reference position SP set on a display surface 110a of the display unit 110 to a viewer U and a normal line NL of the display surface 110a. The illumination unit 130 sets the direction of the optical axis AX of illumination light L2, for example, such that an incidence angle θ of the illumination light L2 incident on the display unit 110 is equal to the observation angle α. The position set as the reference position SP is arbitrary. For example, the reference position SP is set to the center of the display surface 110a, but the position set as the reference position SP is not limited to this example.

The spread angle Θ of illumination light L2 is controlled based on a distance VR between the viewer U and the display unit 110 (the position information of a viewer U). The distance VR may be a distance D between the viewer U and the reference position SP or may be a distance H between the viewer U and the reference position SP in a direction parallel to the normal line NL of the display surface 110a. When the distance VR is large, the illumination unit 130 sets the spread angle Θ of the illumination light L2 to be small. When the distance VR is small, the illumination unit 130 sets the spread angle Θ of the illumination light L2 to be large.

For example, as illustrated in FIG. 10, when the distance VR1 increases, an angle (hereinafter, referred to as an "interocular angle") EA1 which is formed by the direction in which the right eye of a viewer U views an image and the direction in which the left eye of the viewer U views the image decreases. Accordingly, the spread angle Θa of the illumination light L2 can be set to decrease similarly to the interocular angle EA1. When the spread angle Θa of the illumination light L2 is larger than the interocular angle EA1, plural parallax images can be separated and can be observed. However, when the spread angle Θa of the illumination light L2 is excessively larger than the interocular angle EA1, an amount of light emitted to a position which is not viewed by the viewer U increases. Accordingly, the spread angle Θa of the illumination light L2 is set to the same magnitude as the interocular angle EA1.

For example, as illustrated in FIG. 11, when the distance VR2 decreases, the interocular angle EA2 increases. Accordingly, the spread angle Θb of the illumination light L2 needs to increase similarly to the interocular angle EA2. When the spread angle Θb of the illumination light L2 is larger than the interocular angle EA2, plural parallax images can be separated and can be observed. However, when the spread angle Θb of the illumination light L2 is excessively larger than the interocular angle EA2, an amount of light emitted to a position which is not viewed by the viewer U increases. Accordingly, the spread angle Θb of the illumination light L2 is set to the same magnitude as the interocular angle EA2.

The spread angle Θ of the illumination light L2 can be controlled by controlling the number of light sources 145 turned on in each light source group 146 (see FIG. 3). The illumination unit 130 changes the number of light sources 145 turned on based on the distance VR between the viewer U and the display unit 110.

Figure 12:
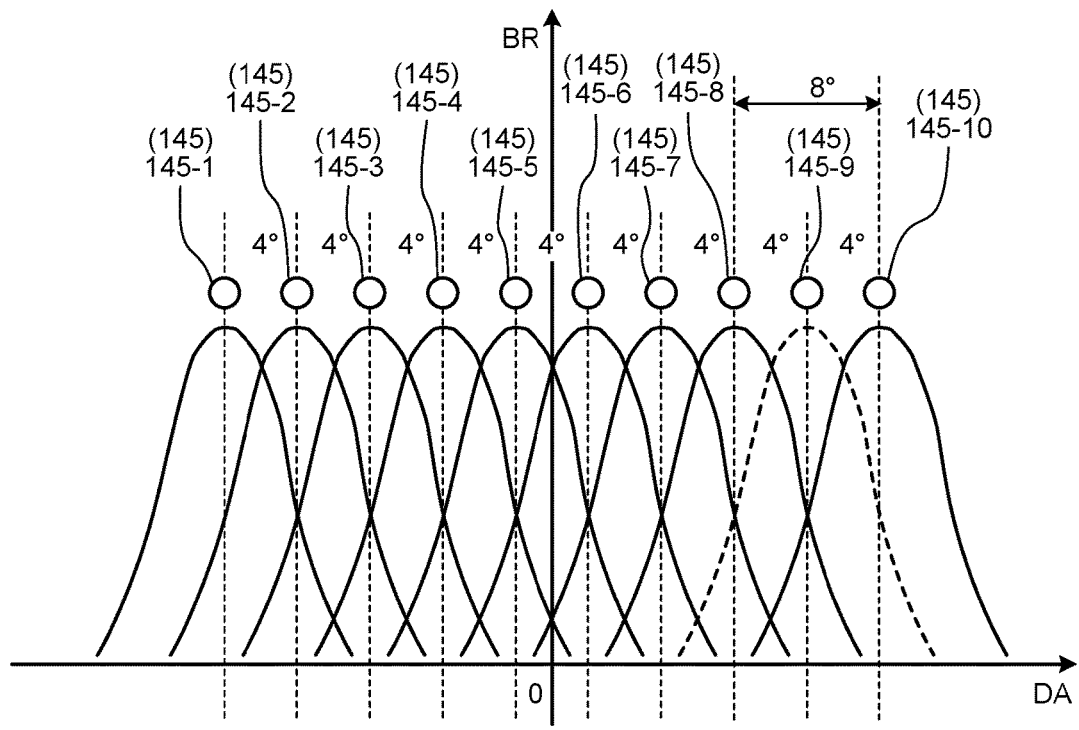
FIG. 12 is a diagram illustrating a relationship between the number of light sources turned on and a spread angle of illumination light.
Figure 13:
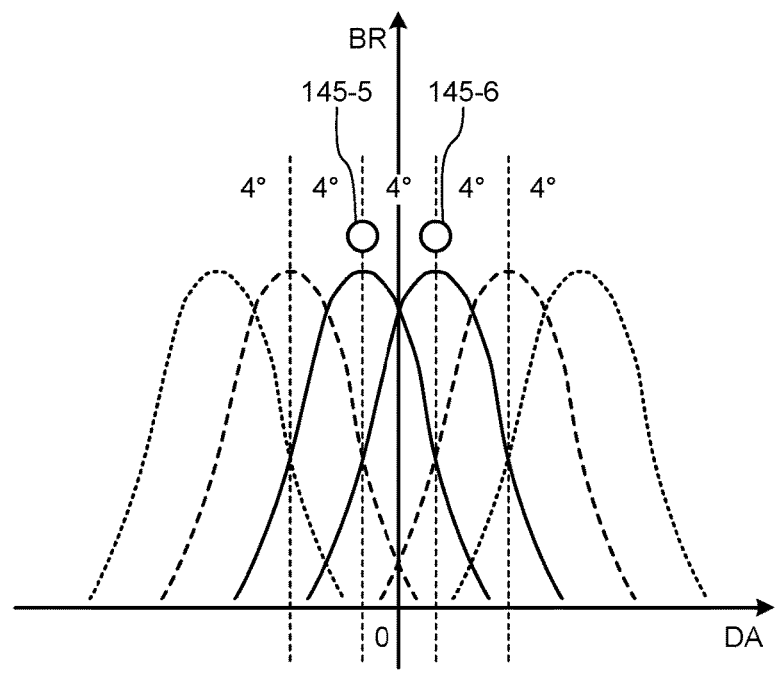
FIG. 13 is a diagram illustrating a relationship between the number of light sources turned on and a spread angle of illumination light.
Figure 14:
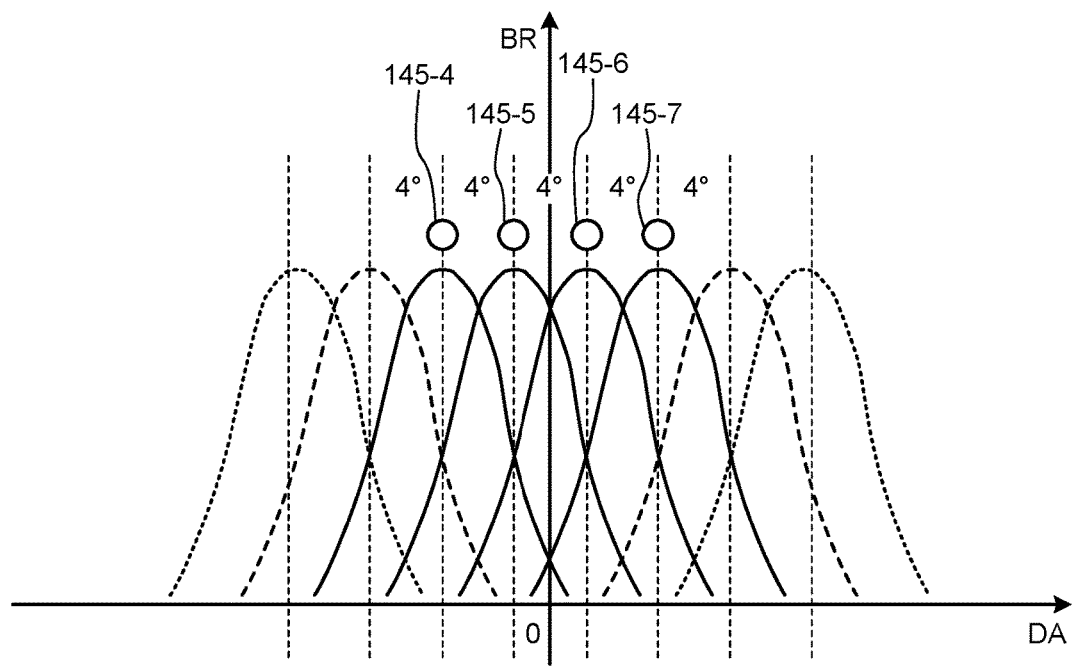
FIG. 14 is a diagram illustrating a relationship between the number of light sources turned on and a spread angle of illumination light.

FIGS. 12 to 14 are diagrams illustrating a relationship between the number of light sources 145 turned on and the spread angle of illumination light. In FIGS. 12 to 14, the horizontal axis represents an irradiation angle DA of illumination light and the vertical axis represents brightness BR of illumination light. In FIGS. 12 to 14, the number of light sources 145 constituting one light source group 146 is 10. Hereinafter, when the ten light sources 145 are distinguished from each other, numerals are added to heads of names of the light sources 145 and the numerals are also added to tails of reference signs thereof.

As illustrated in FIG. 12, the optical axes of ten illumination light components which are obtained when the ten light sources 145 are independently turned on are different from each other by 4°. The angle distribution of the illumination light components is a Gaussian distribution. The spread angle of each illumination light component is 8° and each illumination light component is emitted to a range of about 8° with respect to the optical axis thereof. Accordingly, by increasing the number of light sources 145 turned on, the spread angle of the illumination light can be increased. By changing the lighting positions of the light sources 145, it is possible to change the direction of the optical axis of the illumination light (incidence angle on the display unit).

For example, as illustrated in FIG. 13, when two light sources 145 (the fifth light source 145-5 and the sixth light source 145-6) located at the center of the light source group are simultaneously turned on, the spread angle of the illumination light is 12° and the incidence angle of the illumination light on the display unit is 0°. As illustrated in FIG. 14, when four light sources 145 (the fourth light source 145-4, the fifth light source 145-5, the sixth light source 145-6, and the seventh light source 145-7) located at the center of the light source group are simultaneously turned on, the spread angle of the illumination light is 20° and the incidence angle of the illumination light on the display unit is 0°.

Figure 15:
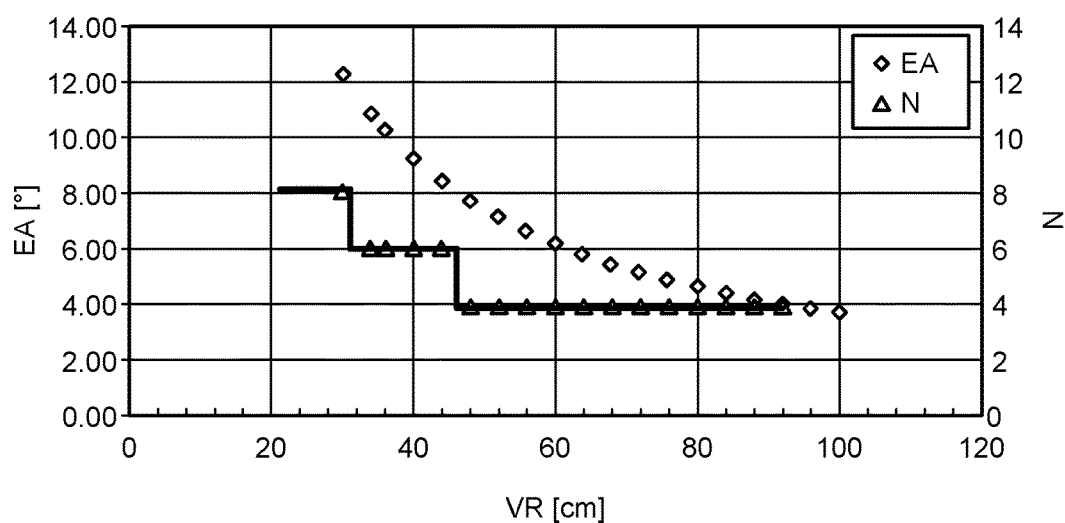

FIG. 15 is a diagram illustrating a relation between the distance VR between a viewer and the display unit and the optimal number N of light sources turned on. In FIG. 15, the horizontal axis represents the distance VR, the right vertical axis represents the optimal number N of light sources turned on, and the left vertical axis represents the interocular angle EA.

As illustrated in FIG. 15, the optimal number N of light sources turned on increases as the distance VR decreases. For example, when the distance VR is equal to or less than 30 cm, the interocular angle EA is equal to or more than 12° and the optimal number N of light sources turned on is 8. When the distance VR is equal to or less than 46 cm, the interocular angle EA is equal to or more than 8° and the optimal number N of light sources turned on is 6. When the distance VR is equal to or less than 92 cm, the interocular angle EA is equal to or more than 4° and the optimal number N of light sources turned on is 4. Accordingly, in comparison with a case in which ten light sources are always turned on, the power consumption decreases by 20% when the distance VR is equal to or less than 30 cm, the power consumption decreases by 40% when the distance VR is equal to or less than 46 cm, and the power consumption decreases by 60% when the distance VR is equal to or less than 92 cm.

In this case, the display becomes brighter as the viewer becomes closer to the display unit and the display becomes darker as the viewer becomes farther from the display unit. Accordingly, the illumination unit 130 may change the brightness of the light sources 145 to be turned on based on the distance VR between the viewer and the display unit. For example, when the brightness of the light source to be turned on becomes less as the distance VR becomes less, a large variation of the brightness depending on the distance VR is suppressed.

FIGS. 16 to 19 are diagrams illustrating a display method when a display is performed in the 3D mode. FIG. 20 is a timing chart illustrating various signals when a display is performed in the 3D mode. In FIG. 20, sign PDS represents a signal on the position information of a viewer which is supplied to the control unit 200 by the image analyzing unit 320 illustrated in FIG. 1, sign BDS represents the separator control signal which is supplied to the separation unit 120 by the separator control unit 220, sign TR represents the transmittance of a specific shutter area 126-1 (see FIGS. 16 to 19) disposed in the separation unit 120, and sign LDS represents the illumination control signal which is supplied to the illumination unit 130 by the illumination control unit 230. In FIG. 20, the horizontal axis represents the time.

The operations of the control unit 200 and the detection unit 300 will be described below with reference to FIGS. 1, 2, and 20.

The image analyzing unit 320 supplies a signal PDS on the position information of a viewer U to the control unit 200 every predetermined time. The position information acquiring unit 240 acquires the position information on the positions of the viewer U every predetermined time (position information acquiring step). The position information acquired by the position information acquiring unit 240 is supplied to the control unit 200. The timing at which the signal PDS is supplied to the control unit 200 is arbitrary. The signal PDS only has to be supplied to the control unit 200 in synchronization with the timing at which the imaging unit 310 images the viewer U.

The separator control unit 220 supplies the separator control signal BDS to the separation unit 120 in synchronization with the timing at which the signal PDS is supplied. The transmittance of the shutter areas 126 disposed in the separation unit 120 is controlled based on the position information of the viewer U in accordance with the separator control signal BDS. Accordingly, the separation unit 120 changes the position of the image separator B based on the position information of the viewer U (separator control step).

The illumination control unit 230 supplies the illumination control signal LDS to the illumination unit 130 in synchronization with the timing at which the signal PDS is supplied. The lighting positions of the light sources 145 disposed in the illumination unit 130 are controlled based on the position information of the viewer U in accordance with the illumination control signal LDS. For example, the illumination unit 130 irradiates the display unit 110 with the illumination light L2 after the changing of the transmittance TR of the shutter areas 126 located at the positions at which the image separator B should be formed is completed. Accordingly, the illumination unit 130 changes the direction of the optical axis AX of the illumination light L2 based on the position information of the viewer U in synchronization with the timing at which the position of the image separator B is changed (illumination control step). Here, the illumination unit 130 may change the direction of the optical axis AX of the illumination light L2 by switching the light sources 145 in a state in which the illumination light L2 is emitted.

The display unit 110 modulates the illumination light L2 and displays an image including plural parallax images (display step).

The operations of the separation unit 120 and the illumination unit 130 will be described below with reference to FIGS. 16 to 19. The times t illustrated in FIGS. 16 to 19 correspond to time t illustrated in FIG. 20.

Figure 16:
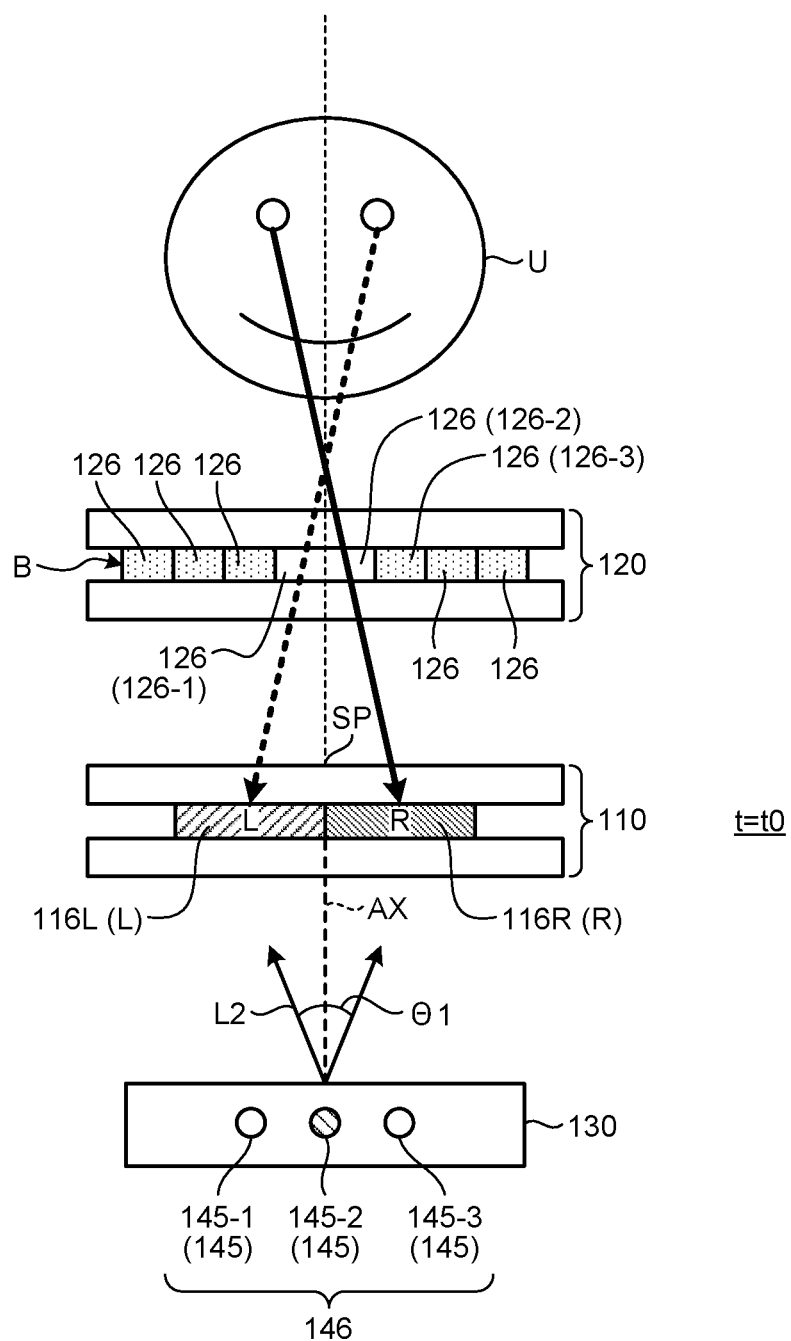
FIG. 16 is a diagram illustrating a display method when a display is performed in a 3D mode.

As illustrated in FIG. 16, when time t is t0, the viewer U views an image (right-eye parallax images R and left-eye parallax images L) on the display unit 110 from a first position. The first position is a position facing the reference position SP. The observation angle of the viewer U is 0°.

The separation unit 120 increases the transmittance of two shutter areas 126 (the shutter area 126-1 and the shutter area 126-2) located in the boundary between the right-eye image area 116R and the left-eye image area 116L and decreases the transmittance of the shutter areas 126 adjacent to the two shutter areas 126, such that the viewer U can appropriately view the right-eye parallax image R and the left-eye parallax image L. The image separator B is formed by the shutter areas 126 of which transmittance is decreased.

The illumination unit 130 turns on the light source 145-2 located at the center of the light source group 146 and causes the illumination light L2 to be perpendicularly incident on the display unit 110 so as to emit the illumination light L2 to the viewer U. The illumination unit 130 changes the number of light sources 145 turned on based on the distance between the viewer U and the display unit 110 and controls the spread angle Θ1 of the illumination light L2.

Figure 17:
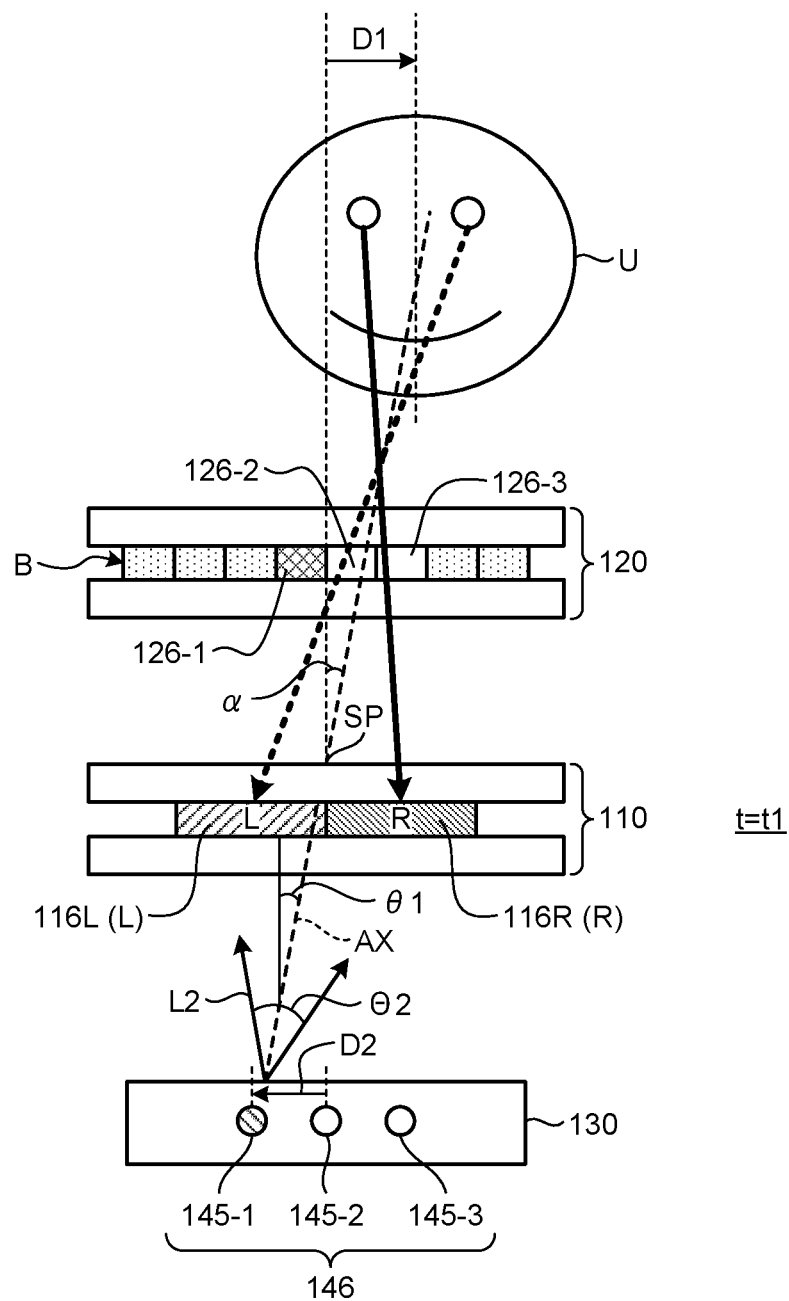
FIG. 17 is a diagram illustrating a display method when a display is performed in a 3D mode.

As illustrated in FIG. 17, when time t is t1, the viewer U views the image on the display unit 110 from a second position. The second position is a position which is shifted in a first direction D1 (for example, the rightward direction in FIG. 17) along the arrangement direction of the light sources 145 from the first position. When the viewer U moves in the first direction D1, the observation angle of the viewer U is changed in the first direction D1.

The separation unit 120 shifts the position of the image separator B in the first direction D1 which is the same as the moving direction of the viewer U such that the viewer U can appropriately view the right-eye parallax image R and the left-eye parallax image L. Specifically, the separation unit 120 increases the transmittance of the shutter area 126-2 and the shutter area 126-3 adjacent to the shutter area 126-2 and decreases the transmittance of the shutter area 126-1. Accordingly, the position of the image separator B is shifted in the first direction D1 by the size of one shutter area in comparison with the case in which the display unit is viewed at the first position.

The illumination unit 130 moves the lighting positions of the light sources 145 in a direction D2 directed from the second position to the first position when the position to which the optical axis AX of the illumination light L2 is directed is changed from the first position to the second position, where the first position and the second position are separated from each other in the arrangement direction of the light sources 145. For example, the illumination unit 130 turns on the light source 145-1 located at the left end of the light source group 146 and turns off the light source 145-2 located at the center and turned on already. Accordingly, the illumination unit 130 causes the illumination light L2 to be obliquely incident on the display unit 110 at an incidence angle θ1 to correspond to the observation angle α of the viewer U. The illumination unit 130 changes the number of light sources 145 turned on based on the distance between the viewer U and the display unit 110 and controls the spread angle Θ2 of the illumination light L2. As illustrated in FIG. 20, the transmittance of the shutter areas 126-1 is slowly changed. Accordingly, the illumination unit 130 irradiates the display unit 110 with the illumination light L2 after the changing of the transmittance of the shutter area 126-1 is completed.

Figure 18:
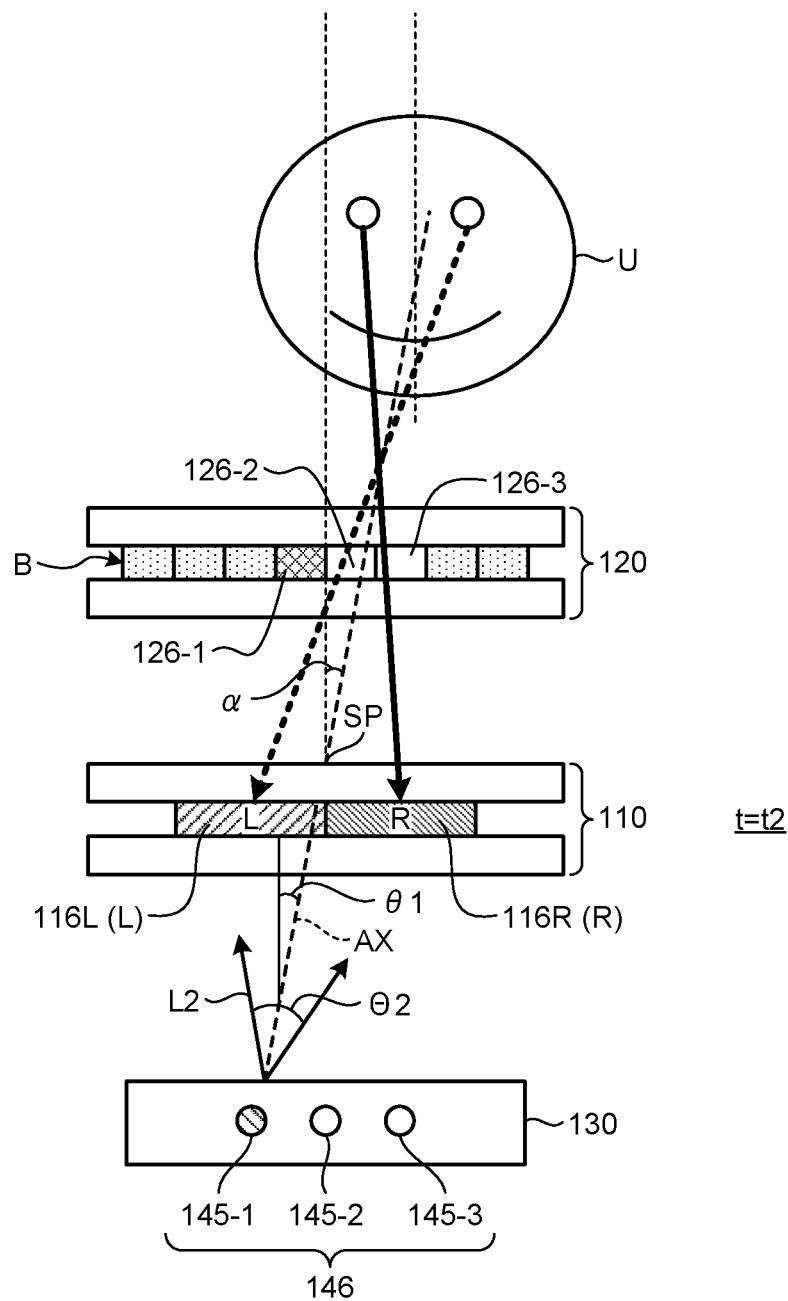
FIG. 18 is a diagram illustrating a display method when a display is performed in a 3D mode.

As illustrated in FIG. 18, when time t is t2, the viewer U views the image on the display unit 110 from the second position. The viewer U stops and views the display at the same position from time t1 to time t2. The position of the image separator B is not changed from time t1 to time t2, and the direction of the optical axis AX of the illumination light L2 and the spread angle Θ2 of the illumination light L2 are not changed from time t1 to time t2.

Figure 19:
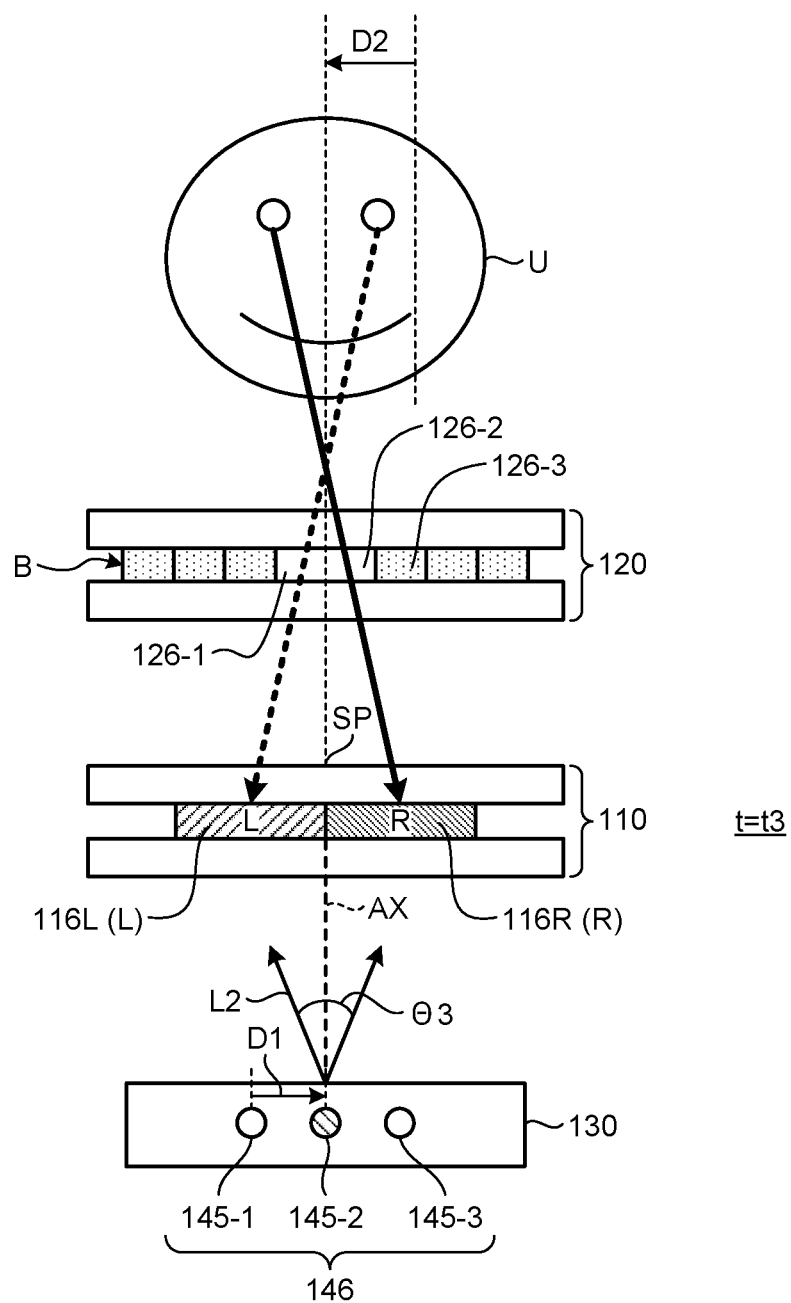
FIG. 19 is a diagram illustrating a display method when a display is performed in a 3D mode.
Figure 20:
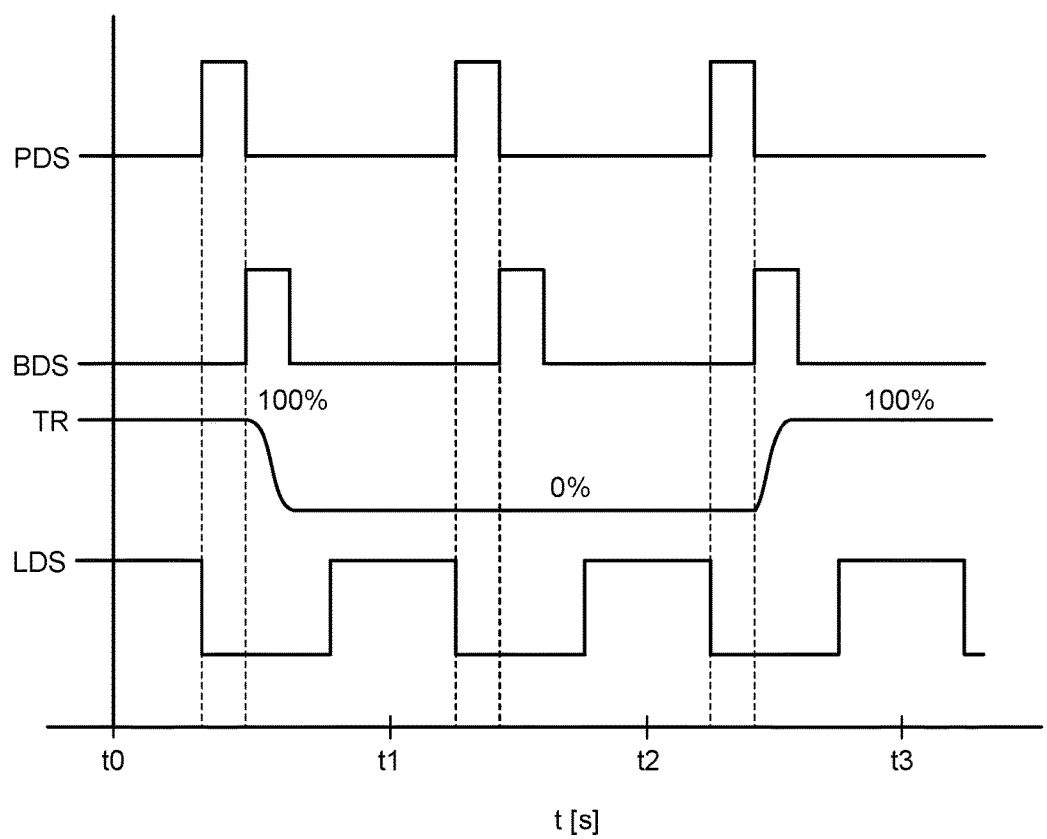
FIG. 20 is a timing chart illustrating various signals.

As illustrated in FIG. 19, when time t is t3, the viewer U views the image on the display unit 110 from a third position. The third position is a position which is shifted in a second direction D2 (for example, the leftward direction in FIG. 19) along the arrangement direction of the light sources 145 from the second position. In FIG. 19, for example, the third position is the same as the first position. When the viewer U moves in the second direction D2, the observation angle of the viewer U is changed in the second direction D2.

The separation unit 120 shifts the position of the image separator B in the second direction D2 which is the same as the moving direction of the viewer U such that the viewer U can appropriately view the right-eye parallax image R and the left-eye parallax image L. Specifically, the separation unit 120 increases the transmittance of the shutter area 126-1 and the shutter area 126-2 and decreases the transmittance of the shutter area 126-3. Accordingly, the position of the image separator B is shifted in the second direction D2 by the size of one shutter area in comparison with the case in which the display unit is viewed at the second position.

The illumination unit 130 moves the lighting positions of the light sources 145 in a direction D1 directed from the third position to the second position when the position to which the optical axis AX of the illumination light L2 is directed is changed from the second position to the third position, where the second position and the third position are separated from each other in the arrangement direction of the light sources 145. For example, the illumination unit 130 turns on the light source 145-2 located at the center of the light source group 146 and turns off the light source 145-1 located at the left end and turned on already. Accordingly, the illumination unit 130 causes the illumination light L2 to be perpendicularly incident on the display unit 110 to correspond to the observation angle of the viewer U. As illustrated in FIG. 20, the transmittance of the shutter areas 126-1 is slowly changed. Accordingly, the illumination unit 130 irradiates the display unit 110 with the illumination light L2 after the changing of the transmittance of the shutter area 126-1 is completed. The illumination unit 130 changes the number of light sources 145 turned on based on the distance between the viewer U and the display unit 110 and controls the spread angle Θ3 of the illumination light L2.

As described above, in the display device 1 according to this embodiment, the position of the image separator B, the direction of the optical axis AX of the illumination light L2, and the spread angle Θ of the illumination light L2 are changed based on the position of the viewer U. Accordingly, even when the position of the viewer U is changed, display defect such as a reverse view is not likely to occur and an amount of unnecessary light which is not viewed by the viewer U is small. As a result, it is possible to suppress loss of light and to display a stereoscopic image at various positions.

While exemplary embodiments of the present invention have been described above, the present invention is not limited to the embodiments. Details disclosed in the embodiments are merely an example and can be modified in various forms without departing from the gist of the present invention. Appropriate modifications made without departing from the gist of the present invention will belong to the technical scope of the present invention.

For example, in the above-mentioned embodiments, a connector is exemplified as the position information acquiring unit 240, but the position information acquiring unit 240 is not limited to the connector. A flexible printed circuit board, an input terminal, or the like may be used as the position information acquiring unit. A liquid crystal panel is exemplified as the separation unit 120, but the separation unit 120 is not limited to the liquid crystal panel. A light blocking plate having an opening formed therein may be used as the separation unit 120. In this case, a moving unit that mechanically moves the light blocking plate based on the position of a viewer U is disposed in the display device 1. A lens (refractive element) is exemplified as the light adjustment layer 152, but the light adjustment layer 152 is not limited to the lens. A diffractive element that adjusts an optical axis using a diffraction phenomenon such as a hologram element may be used as the light adjustment layer 152.

In the above-mentioned embodiment, the detection unit 300 includes the imaging unit 310 and the image analyzing unit 320, but the configuration of the detection unit 300 is not limited to this configuration. For example, the detection unit 300 may convert a time until a reflected wave of an infrared ray or an ultrasonic wave emitted to a viewer U is received into a distance to detect the position information of the viewer U. The detection unit 300 may detect information (position information) on the relative position between the viewer U and the display unit 110 using a global positioning system (GPS).

In the above-mentioned embodiment, a parallax barrier is exemplified as the image separator B, but the configuration of the image separator is not limited to this configuration. The image separator B may be a lenticular lens. In this case, the separation unit 120 includes plural shutter areas 126 of which a refractive index distribution can be controlled. The separation unit 120 forms the image separator B by controlling the refractive index distribution of the plural shutter areas 126. The image separator B includes plural lens portions serving as a convex lens (a plano-convex lens or a Fresnel lens). Each lens portion includes plural shutter areas 126. Plural parallax images displayed on the display unit 110 are separated by the image separator B. The refractive index distribution of the shutter areas 126 is controlled based on an orientation distribution of the liquid crystal layer 123 (an electric field distribution in the liquid crystal layer 123). In the separation unit 120, a refractive index distribution of a convex lens shape over plural shutter areas 126 is realized by controlling the voltage applied to the liquid crystal layer 123 of the shutter areas 126 in accordance with the separator control signal.

In the above-mentioned embodiment, the light source 145 is constituted by an organic EL element, but the configuration of the light source 145 is not limited to this configuration. The light source 145 may be constituted by a light emitter and a light guide member. For example, in the light source substrate 140, plural stripe-shaped first light guide members are arranged in the arrangement area of the plural light sources 145 illustrated in FIG. 5 and plural (six in the example illustrated in FIG. 5) stripe-shaped second light guide members are arranged in the arrangement area of the plural wirings 147. Every six first light guide members are coupled to the same second light guide member. A light emitter is disposed at an end of each of the second light guide members. The light emitters are driven independently of each other. In this configuration, the plural first light guide members are grouped into six groups. Light from the light emitters is simultaneously incident on the first light guide members included in each group via the common second light guide member and light propagating in the first light guide members is emitted to the display unit 110.

In the above-mentioned embodiment, it has been exemplified that the position information on the positions of viewer U is acquired and the separation unit 120 or the illumination unit 130 is controlled based on the position information. However, the method of controlling the separation unit 120 or the illumination unit 130 is not limited to this method.

For example, the position information of the viewer U may be external information input from the outside via the position information acquiring unit 240 and is not limited to the information directly indicating positional coordinates of the viewer U. For example, the position information of the viewer U may be control information of the separation unit 120 or the illumination unit 130 corresponding to the positional coordinates of the viewer U. The position information of the viewer U may include position information of the image separator B. The position information of the viewer U may include information of the lighting positions of the illumination unit 130 corresponding to the position of the image separator B or information of the number of light sources turned on.

The position information of a viewer U is not limited to the position information of an actual viewer U acquired by analyzing an image of the viewer U. The position information of a viewer U may be position information set by an input from a viewer U. For example, even when the actual distance between a viewer U and the display unit 110 is X (cm), Y (cm) other than X (cm) may be input as the position information of the viewer U by an input from the viewer U using buttons or the like. In this case, the separation unit 120 or the illumination unit 130 may be controlled based on position information corresponding to Y (cm).

What is claimed is:

1. A display device comprising:
a detector configured to detect position information on a position of a viewer;
a parallax barrier configured to form a first area and a second area, a transmittance of the first area being higher than a transmittance of the second area;
a plurality of light adjustment sets each including a plurality of light sources and a light adjustment layer; and
a display unit configured to display an image including a plurality of parallax images,
wherein
the light sources are disposed on a light source substrate and include a first light source and a second light source,
an optical axis of illumination light from each of the light sources is in a vertical direction vertical to the light source substrate, the optical axis having highest brightness,
the light adjustment layer is configured to change a direction of an optical axis of illumination light irradiated from the first light source to a first bending direction having a first angle with the vertical direction and
a direction of an optical axis of illumination light irradiated from the second light source to a second bending direction having a second angle with the vertical direction, the first angle being different from the second angle, and
the parallax barrier is configured to change a position of the first area to:
a first position such that the optical axis of illumination light irradiated from the first light source passes through the first area; and
a second position such that the optical axis of illumination light irradiated from the second light source passes through the first area.

2. The display device according to claim 1, wherein
a plurality of image areas corresponding to the plurality of parallax images are alternately arranged in an arrangement direction on the display unit,
the plurality of light sources are arranged in a direction parallel to the arrangement direction of the plurality of image areas, and
the light adjustment layer is a lens of which a cross-section parallel to the arrangement direction of the plurality of light sources is convex to the display unit.

3. The display device according to claim 2, wherein the lens is at least one of a plano-convex lens or a Fresnel lens.

4. The display device according to claim 2, wherein
the plurality of light sources include a plurality of first light guide members which are arranged in a direction parallel to the arrangement direction of the plurality of image areas, a plurality of second light guide members which are arranged in a direction intersecting the arrangement direction, and a light emitter which is disposed at an end of each of the plurality of second light guide members, and the plurality of first light guide members are coupled to the same second light guide members every plural number of first light guide members.

5. The display device according to claim 1, wherein
lighting positions of the light sources are moved in a direction directed from the second position to the first position when a position of the first area is changed from the first position to the second position, the first position and the second position being separated along the arrangement direction.

6. The display device according to claim 1, wherein a count of light sources turned on is changed based on the position information.

7. The display device according to claim 1, wherein brightness of the light sources turned on is changed based on the position information.

8. The display device according to claim 1, wherein the detector includes an imaging unit that images the viewer and an image analyzing unit that analyzes the image of the viewer captured by the imaging unit and detects the position information.

9. The display device according to claim 1, wherein
the parallax barrier includes a plurality of shutter areas of which light transmittance is able to be controlled, and
the parallax barrier decreases the transmittance of the shutter areas located at the second area among the plurality of shutter areas.

10. The display device according to claim 9, wherein the light sources irradiate the display unit with the illumination light after that the changing of the transmittance of the shutter areas located at positions at the second area is completed.

11. The display device according to claim 1, wherein the light sources having the same relative position in the light adjustment sets are subjected to the same control.

12. The display device according to claim 1, wherein the light sources having the same relative position in the light adjustment sets are electrically coupled to each other by a common wiring.

13. The display device according to claim 1,
wherein:
the light adjustment layer includes a first light adjustment layer and a second light adjustment layer;
the light sources further include a third light source and a fourth light source; and
the first light adjustment layer configured to change:
a direction of an optical axis of illumination light irradiated from the first light source to the first bending direction having the first angle with the vertical direction; and
a direction of an optical axis of illumination light irradiated from the second light source to the second bending direction having the second angle with the vertical direction, and
the second light adjustment layer configured to change:
a direction of an optical axis of illumination light irradiated from the third light source to the first bending direction having the first angle with the vertical direction; and
a direction of an optical axis of illumination light irradiated from the fourth light source to the second bending direction having the second angle with the vertical direction.

14. The display device according to claim 13, wherein
a relative position of the first light source to the second light source is a same as a relative position of the third light source to the fourth light source.

15. The display device according to claim 13, wherein
a relative position of the first light source to the first light adjustment layer is a relative position of the third light source to the second light adjustment layer.

16. A display device comprising:
a parallax barrier configured to form a first area and a second area, a transmittance of the first area being higher than a transmittance of the second area;
a plurality of light adjustment sets each including a plurality of light sources and a light adjustment layer; and
a display unit configured to display an image including a plurality of parallax images,
wherein
the light sources are disposed on a light source substrate and include a first light source and a second light source,
an optical axis of illumination light from each of the light sources is in a vertical direction vertical to the light source substrate, the optical axis having highest brightness,
the light adjustment layer is configured to change
a direction of an optical axis of illumination light irradiated from the first light source to a first bending direction having a first angle with the vertical direction and
a direction of an optical axis of illumination light irradiated from the second light source to a second bending direction having a second angle with the vertical direction, the first angle being different from the second angle, and
the parallax barrier is configured to change a position of the first area to:
a first position such that the optical axis of illumination light irradiated from the first light source passes through the first area; and
a second position such that the optical axis of illumination light irradiated from the second light source passes through the first area.

17. A display method comprising:
a detecting step of acquiring position information on a position of a viewer;
a parallax barrier control step of forming a first area and a second area, a transmittance of the first area being higher than a transmittance of the second area;
a light adjustment layer control step of changing a direction of an optical axis of illumination light; and
a display step of displaying an image including a plurality of parallax images,
wherein
each of light adjustment sets includes a plurality of the light sources and a light adjustment layer that adjusts light emitted from the light sources,
the light sources are disposed on a light source substrate and include a first light source and a second light source,
an optical axis of illumination light from each of the light sources is in a vertical direction vertical to the light source substrate, the optical axis having highest brightness,
the light adjustment layer control step includes changing:
a direction of an optical axis of illumination light irradiated from the first light source to a first bending direction having a first angle with the vertical direction; and
a direction of an optical axis of illumination light irradiated from the second light source to a second bending direction having a second angle with the vertical direction, the first angle being different from the second angle, and
the parallax barrier control step includes changing a position of the first area to:
a first position such that the optical axis of illumination light irradiated from the first light source passes through the first area; and
a second position such that the optical axis of illumination light irradiated from the second light source passes through the first area.

* * * * *